Figure 1A:
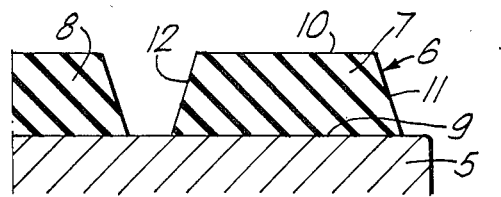

United States Patent [19]

Turner

[11] Patent Number: 4,886,324
[45] Date of Patent: Dec. 12, 1989

[54] BUSH ASSEMBLY FOR TRACK OF TRACKED VEHICLE

[75] Inventor: Donald M. Turner, Bath, Avon, United Kingdom

[73] Assignee: Avon Rubber PLC, England

[21] Appl. No.: 230,239

[22] Filed: Aug. 9, 1988

[30] Foreign Application Priority Data

Aug. 10, 1987 [GB] United Kingdom ............... 8718899

[51] Int. Cl.$^4$ .......................................... B62D 55/215
[52] U.S. Cl. .................. 305/42; 305/58 R; 305/41; 267/276; 277/208
[58] Field of Search .................. 305/39, 41, 42, 58 R, 305/58 PC, 43; 267/293, 276; 277/208, 209, 210, 211; 403/225, 226, 372

[56] References Cited

U.S. PATENT DOCUMENTS

| | | | |
|---|---|---|---|
| 1,971,348 | 8/1934 | Knox | 305/42 |
| 2,291,623 | 8/1942 | Hanson et al. | 305/42 X |
| 2,610,094 | 9/1952 | Grandgirard | 305/42 |
| 2,772,104 | 11/1956 | Thiry | 403/225 |
| 3,820,813 | 6/1974 | Moulton et al. | 267/276 X |
| 3,831,920 | 8/1974 | Meldrum et al. | 267/293 X |
| 4,395,074 | 7/1983 | Haldimann et al. | 305/43 |

FOREIGN PATENT DOCUMENTS 2039836 8/1980 United Kingdom ................. 305/43

Primary Examiner—Russell D. Stormer
Attorney, Agent, or Firm—Brumbaugh, Graves, Donohue & Raymond

[57] ABSTRACT

An improved bush assembly for insertion into an aperture of a lug of a track part of a tracked vehicle is disclosed. An exposed outermost side wall of the bush has an extended surface length, so that when under design precompression the wall makes angles of approximately 90° with the inner surface of the aperture and 70°–80° with the outer surface of the central pin. The wall may be concave and the bush may comprise a number of annular bush parts. The high tensile strains which develop on that wall of the bush are thereby minimized and bulging out of the bush beyond the end of the pin is discouraged.

4 Claims, 4 Drawing Sheets ic assembly is made up of annular bush parts 7,8 bonded to
BUSH ASSEMBLY FOR TRACK OF TRACKED VEHICLE This invention relates to the bush assemblies which interconnect adjacent parts of the track of a tracked vehicle.

The track parts are hinged together by pins acting as the axis of relative rotation of the two parts. The pin does not directly contact either of the two parts since a bushing is inserted between it and the wall of the housing in the part or parts through which it passes.

The bushes are subjected to extremely heavy stresses and usually are the critical element in the life of a track. Any improvement in their life will therefore have substantial advantageous effects from the point of view of maintenance requirements and of the time spent by the tracked vehicle out of commission.

We have studied the reason for the failure of the bushes and have discovered that failure characteristically develops in the surface of the rubber close to the wall of the housing and travels diagonally inwardly towards the pin.

In order to prevent bodily slippage between the bushing and the housing upon rotation, conventionally the bushes are applied under substantial precompression of the order of 25-30%, and are bonded permanently to the pin (Percentage precompression is given by the formula $$\frac{B-H}{B-S} \times 100$$

wherein:
B is the relaxed outside diameter of the bushing
H is the diameter of the wall of the housing
S is the diameter of the pin).

We have found that if we design the bush so that at least its exposed side wall, i.e. that face at the outer end of the bush has under a design precompression specific relationships with the pin and the housing, the high tensile strains which develop on that surface of the bush are minimized and the bush life is extended. In particular, the side wall should meet the pin surface at an acute angle.

The ideal is to achieve a situation where under a lower design precompression of about 17-25%, most preferably about 20%, the angle at which the outer wall of the bush meets the surface to which it is not bonded (i.e. the wall of the housing) is about 90°, while the angle at which the outer wall of the bush meets the pin surface to which it is bonded is preferably a minimum of 70° and a maximum of 80° (i.e. the bush surface forms an angle of between 10° and 20° to the normal of that intersection).

Essentially, this improvement is achieved by extending the surface length of the outermost face of the bush in its relaxed and uncompressed condition in comparison with the shapes which have conventionally been used in the prior art and/or shaping that face in such a way as to assist the desired conformation when under precompression.

Figure 1B:
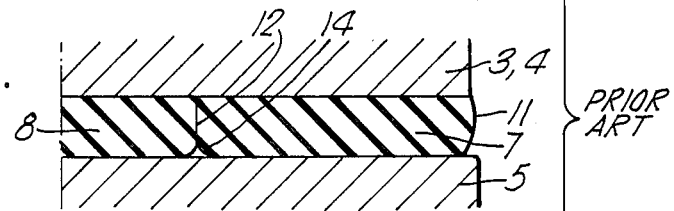
Figure 1C:
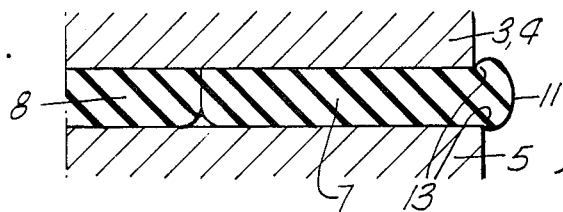
Figure 2A:
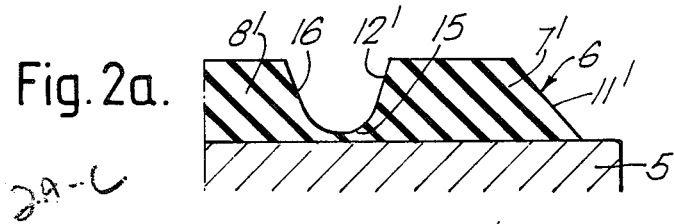
Figure 2B:
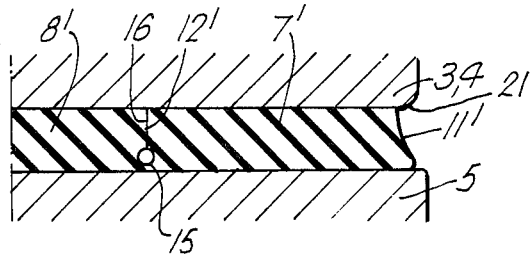
Figure 2C:
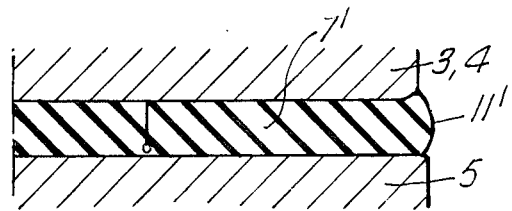
Figure 3A:
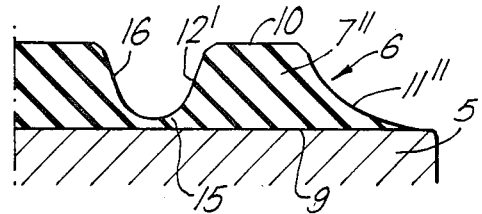
Figure 4A:
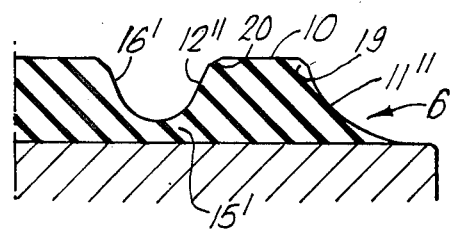
Figure 4B:
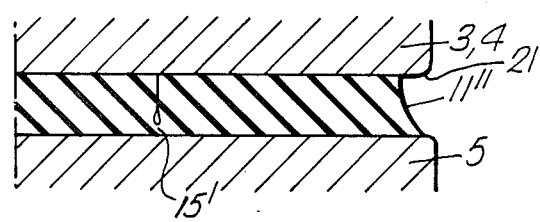
Figure 4C:
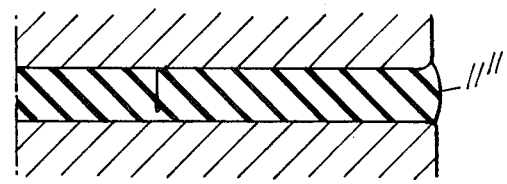
Figure 5A:
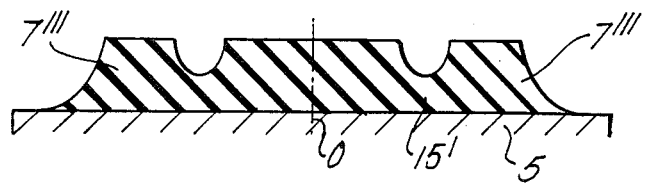
Figure 5B:
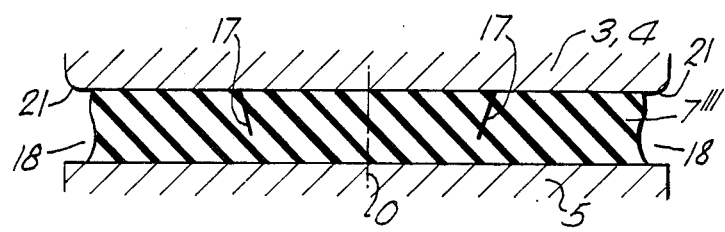
Figure 5C:
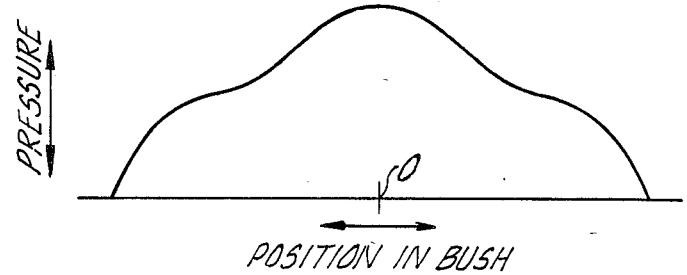
Figure 5D:
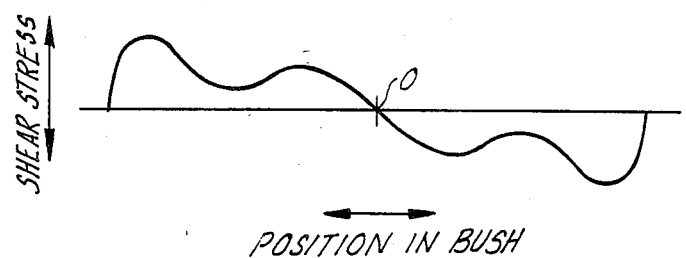
Figure 6:
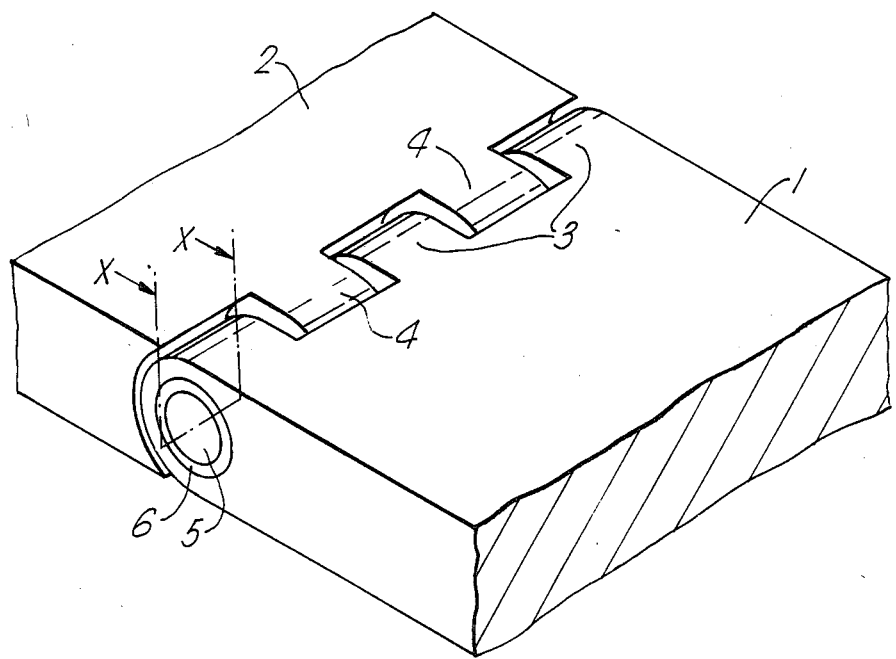

In the attached drawings, FIG. 1 shows in radial cross section one end of a prior art design, FIG. 1a being a bush in its natural uncompressed condition, FIG. 1b showing it under conventional design precompression, FIG. 1c showing it under radial deflection;

FIGS. 2, 3, and 4 show embodiments of the present invention with FIGS. a, b and c correponding respectively to the conditions of FIGS. 1 a, b and c;

FIG. 5 shows more of the embodiment of FIG. 4 with FIGS. 5a and b corresponding respectively as before but of both ends of the bush, FIGS. 5c and 5d being respectively diagrammatic graphs of pressure distribution and shear stress in that embodiment; and FIG. 6 is a sketch perspective view of adjacent track parts, the plane XX indicating schematically the section plane for FIGS. 1 to 4.

Referring first to FIG. 6, adjacent track parts 1,2 of the track of a tracked vehicle have interfingering housings 3,4 each of which has an aperture through it transverse to the direction of the travel of the track in order to permit pivoting movement of the two parts 1,2 relative to each other, this pivotal movement characteristically being through 33°. To permit this, a pin 5 penetrates the apertures of the housings but does not contact their walls directly, being separated by a bush 6 between the pin and each of the housings 3,4.

The bush between the pin and any one of the housings 3,4 may be made up of a plurality of annular bush parts.

A prior art arrangement is seen in FIG. 1. A bush assembly is made up of annular bush parts 7,8 bonded to the surface of the pin 5. They are of a symmetrical trapezoidal section, with the major face 9 bonded to the pin 5. The minor face 10 parallel to it and side faces 11,12 equally angled at approximately 20° to the normal, that is to say the included angle between the side face 11 and the major face 9 is of the order of 70°.

When these bush parts 7 and 8 are subjected to the desired standard precompression (in current designs this is usually about 27%) between the pin 5 and the wall of the housing 3 or 4 they adopt the conformation seen in FIG. 1b. It will be seen that the side wall 11 of the outermost bush part 7 bulges outwardly and includes an obtuse angle both where it meets the pin 5 and where it meets the wall of the housing 3 or 4. Furthermore due to its conformation it tends to have a greater width at its radially outer part, that is to say where it meets the wall of the housing 3 or 4, than at the pin 5.

If this precompressed bush is subjected to radial deflection between the housing and pin the situation is seen in FIG. 1c, where an extrusion of the surface 11 beyond the end of the pin 5 occurs with a major expansion of that surface and also with the development of overhang angles in the regions 13 where chafing can occur between the bush material and the adjacent metallic surface, especially at that surface to which the bush is not bonded.

At the side surfaces such as 12 which are not laterally outermost in the given bush, the effect of the precompression is seen in FIGS. 1b and 1c, namely to cause the adjacent side walls to lie in contact with each other, but there is an extension of the rubber in the region 14 adjacent the surface of the pin 5.

We have discovered that problems arise in the prior art due particularly to the conformation of the outer side wall 11 under precompression or radial deflection and in the embodiments of the invention about to be described these problems are substantially diminished.

In the embodiment of bush assembly seen in FIG. 2, in the annular bush part now denominated 7' the side wall 11 is increased in its length in comparison with the prior art side wall to the effect that when, as seen in FIG. 2b, it is under a design precompression, its region of intersection with the housing 3,4 is at an angle of substantially 90° to the wall of that housing. The curvature of the wall 11' when under precompression is inward (concave) compared to the outward (convex) bulge seen in FIG. 1b; it follows that in this embodiment the region of the surface 11' near to the pin 5 includes an acute angle with the pin surface.

The other side wall is also modified as seen at 12' by being continued through a curved trough transition 15 into the side wall of the annulus 8' which, not being a laterally outer end wall, is symmetrically angled with relation to the wall 12'.

The situation which occurs upon precompression of this formation can be seen in FIG. 2b. Again the side wall 12' contacts the wall 16, but the effect of the curved transition 15 is that there is a reduced strain on the annulae in the region where they are bonded to the pin 5. In contrast to the prior art, a preferred degree of diametrical precompression is about 20%, but the principles apply even if other design precompressions, including the standard 27%, are used.

FIG. 2c shows a surface 11' when there is radial deflection between the parts. Although there is a bulge in the bush wall, it does not extend significantly, if at all, beyond the line of the end of the pin 5 and no overhang angles are formed.

In the embodiment of FIG. 3, a more preferred formation for the side wall 11 is seen. In this embodiment the side wall 11" of an annular bush part 7" presents a continuously increasing angle to the normal as it proceeds from its minor face 10 to its major face 9. The side walls 12' and 16 are as seen in FIG. 2.

Figure 3B:
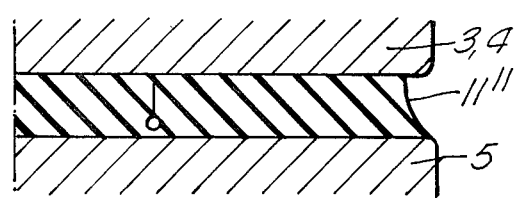

The conformation 11" is seen in FIG. 3b showing the effect of precompression. The region of the end wall directly adjacent the wall of the housing 3,4 is substantially perpendicular to that wall while in the region adjacent the pin 5 we have an angle of approximately 20° to the normal, that is to say the included angle is approximately 70°. A preferred range for that angle is between 70° and 80°. At the other surface the angle should be as precisely as possible 90°.

Figure 3C:
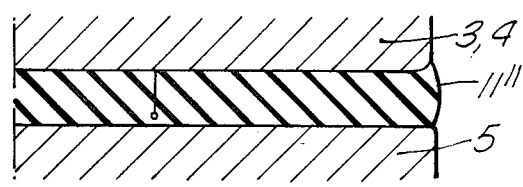

Upon the half millimeter radial deflection we have the position seen in FIG. 3c, with a slight outward bulge 11" without irregularities or concentrated stress areas.

FIGS. 4a, 4b and 4c show an embodiment with an outermost side wall conformation 11" exactly as in FIG. 3, but illustrates that between the walls 12" and 16', a curved transition 15' need not extend to the whole depth of the annulae, that is to say the major surface 9 is a continuous surface of the whole of the annulae which make up the bush for a given housing 3 or 4. This conformation of the side walls 12" and 16', with the troughs being of only part depth of the annulae and being at a full radius, i.e. substantially semicircular in section, as shown in FIG. 4b, has been found to be especially preferable.

In a conventional bush comprising separate annular bush parts 7,8 (FIG. 1) the rubber in an annulus 7 is displaced in both axial directions, which means that shear stress associated with the major face 9 of the annulus 7 does not act so as to contribute to containing the overall pressure in the bush. In the variant of FIG. 4 shown in FIGS. 5a and 5b, in which the bush is made up of three annular bush parts merging with each other in regions adjacent to the pin, the shear stress always acts to contribute to containing the overall pressure, particularly when the bush becomes radially loaded by the tension in the track. FIG. 5c is a curve showing the variation in radial pressure within the bush and FIG. 5d shows the accompanying variation in shear stress taken at a level adjacent the surface of the bush adjacent to the pin, with reference to the median plane O of the bush. When such a bush is fitted in a housing the volume of rubber displaced from the central annulus substantially fills the adjacent troughs; the lines 17 indicate approximately where the masses of rubber meet.

In such a bush assembly, the volume of rubber available in the bush filled approximately 90% of the space available between the pin and the wall of the housing (i.e. about 5% of that space is left vacant, in regions 18, beyond each exposed side wall of the bush).

It can be seen from FIG. 5 that, as is preferred in all embodiments where there are multiple bush parts between a given pin and housing, the axial length of the centre rib is greater than and preferably more than twice as great as the axial length of the outermost ribs. This is best measured at the radially outer surface.

FIG. 4 shows how, to avoid any risk of abrasion at the contact positions with the unbonded surface, corners 19,20 of the minor surface 10 may be bevelled off; and also corners 21 of the housing wall 3,4 can be rounded, as seen in FIGS. 2–4.

I claim:

1. A bush assembly for a housing of a track part of a tracked vehicle, said housing having an inner wall, said assembly comprising a rigid central pin and a bush of resilient material, said pin having an outer surface; said bush having a radially innermost surface in contact with and bonded to said outer surface of said pin and a radially outermost surface spaced from said radially innermost surface, said radially outermost surface for being in contact with said inner wall of said housing for precompressing said bush between said outer surface of said pin and said inner wall of said housing; said bush comprising a plurality of annular bush parts disposed axially along said outer surface of said pin, an axially outermost bush part having a first side wall for being positioned adjacent an end of the housing and a second side wall on a side of said bush axially remote from said first side wall, wherein, when in a relaxed, non-compressed condition, the length of said first side wall between said inner wall of said housing and said outer surface of said pin is greater than the length of said second side wall.

2. A bush assembly according to claim 1, wherein said bush parts have mutually adjacent side walls merging with each other in a region immediately adjacent said outer surface of said part of said common central pin.

3. A track according to claim 2, wherein the axial length of a central bush part is at least twice the axial length of each outermost bush part.

4. A bush assembly according to claim 1, wherein the axial length of a central bush part is at least twice the axial length of each outermost bush part.

* * * * *